United States Patent [19]

Sierens et al.

[11] Patent Number: 5,323,255

[45] Date of Patent: Jun. 21, 1994

[54] TRANSCEIVER ARRANGEMENT USING TDM TO TRANSMIT ASSIGNED SUBCARRIER WAVEFORMS

[75] Inventors: Christiaan H. J. Sierens, Kontich; Denis J. G. Mestdagh, Brussels; Gert Van Der Plas, Merchtem, all of Belgium

[73] Assignee: Alcatel N.V., Amsterdam, Netherlands

[21] Appl. No.: 878,820

[22] Filed: May 5, 1992

[30] Foreign Application Priority Data

May 8, 1991 [BE]  Belgium ............................. 9100431

[51] Int. Cl.$^5$ .......................................... H04B 10/00
[52] U.S. Cl. .................................. 359/137; 359/123; 359/135; 359/152
[58] Field of Search ............... 359/123, 124, 125, 135, 359/137, 139

[56] References Cited

U.S. PATENT DOCUMENTS

| 4,704,715 | 11/1987 | Shibagaki et al. | 359/123 |
| 5,007,050 | 4/1991 | Kasparian et al. | 359/135 |
| 5,077,727 | 12/1991 | Suzuki | 359/123 |

FOREIGN PATENT DOCUMENTS

| 56-91547 | 7/1981 | Japan | 359/123 |
| 0148726 | 6/1988 | Japan | 359/123 |
| 8800706 | 6/1989 | PCT Int'l Appl. | |
| 9109478 | 6/1991 | PCT Int'l Appl. | |
| 2113049 | 7/1983 | United Kingdom | 359/123 |
| 2181920 | 4/1987 | United Kingdom | |
| 8909518 | 10/1989 | United Kingdom | 359/123 |

OTHER PUBLICATIONS

Revue HF. vol. 14, No. 7/8, 1990, Ophain BE pp. 194"210; D. Mestdagh et al.: 'Broadband passive optical access networks.' *p. 199, line 7–line 11–*p. 201, line 16–p. 203, line 7–*p. 206, line 1–p. 207, line 36.
IEEE Journal on Selected Areas in Communication, vol. 8, No. 7, Sep. 1, 1990, New York US pp. 1340-1350; Kwok-Wai Cheung: 'An evolutionary transport structure for local loop distribution using RF subcarriers' *p. 1346, col. 2, line 28–line 29.
Proceedings of the European Conference of Optical Communication (ECOC) Part 1, Sep. 11, 1988, Brighton, UK, pp. 203–206; J. R. Stern et al: 'TPON-A passive optical network for telephony'.
BBC Research Department Report No. 3, Mar. 1988, Tadworth GB, pp. 1–31, R. P. Morsden et al.: 'Digital television routing systems: A survey of optical and electrical techniques' paragraph 10.
IEEE Journal on Selected Areas in Communication, No. 7, Sep. 1990, New York, U.S., pp. 1240–1248, Thomas Darcie: 'Subcarrier multiplexing for lightwave networks and video distribution systems'.

*Primary Examiner*—Richard E. Chilcot, Jr.
*Assistant Examiner*—Rafael Bacares
*Attorney, Agent, or Firm*—Ware, Fressola, Van Der Sluys & Adolphson

[57] ABSTRACT

Optical transceiver arrangement to transmit information signals (S1, ., Sn) from a transmitter arrangement (T) to a receiver arrangement (R) over an optical waveguide (L). This is achieved by modulating electrical subcarrier waveforms with these information signals (S1, ., Sn) using modulation means (M1, ., Mn), converting them to optical signals using electrical/optical convertors (E/O1, ., E/O1n), and by transmitting these optical signals, by means of time division multiplexing means (TDM1, ., TDMn), in different time slots if the subcarrier waveforms have the same frequency. The modulation- and time division multiplexing means are controlled by corresponding individual control modules (C1, ., Cn) under control of a central control module (CC) included in the receiver arrangement.

33 Claims, 4 Drawing Sheets

TRANSCEIVER ARRANGEMENT USING TDM TO TRANSMIT ASSIGNED SUBCARRIER WAVEFORMS

OPTICAL TRANSCEIVER METHOD AND ARRANGEMENT

TECHNICAL FIELD

The present invention relates to a method and transceiver arrangement for an optical communication system to transmit n electrical information signals applied to respective input terminals by n substations, and more particularly to a receiver arrangement over an optical waveguide.

BACKGROUND OF THE INVENTION

Such transceiver arrangements include a transmitter arrangement which itself includes:
- n modulation means each of which has an input coupled to a respective one of the input terminals and is able to modulate a respective one of an electrical subcarrier waveforms having an assigned frequency with the information signal applied to the input, and
- conversion and combining means having inputs connected to the outputs of said modulation means and an output at which a composite optical signal derived from said modulated subcarrier waveforms is generated, the composite optical signal being transmitted to the receiver arrangement over the optical waveguide.

Such a transceiver arrangement is already known in the art, e.g. from the published German patent application DE-A1-3907495.

In this known transceiver arrangement each of the modulation means has a fixed assigned carrier waveform frequency and therefore a fixed assigned bandwidth capacity which may only be used by the substation connected to the corresponding input terminal. This means that in some cases, when part of the bandwidth capacity is not used, e.g. when supporting narrowband services or when the substation is temporarily not transmitting information signals, the free bandwidth cannot be made available to other substations. In addition, the more substations use the transceiver arrangement, the more difficult it becomes to assign new and usable subcarrier waveform frequencies to the modulation means used by the new substations.

Another consequence of having a relatively high number of substations is that, at the receiver arrangement side because of the number of light signals falling simultaneously on conversion means, more particularly a light detector, included in that receiver arrangement, shot noise and optical interference noise may increase.

DISCLOSURE OF INVENTION

An object of the invention is to provide a transceiver arrangement of the above type, but which is suitable for being used by a relatively high number of substations and has an optimal bandwidth efficiency even when such a substation does not fully use the bandwidth capacity of a subcarrier waveform.

This object is achieved due to the face that said transmitter arrangement additionally includes time division multiplexing means and said transceiver additionally includes control means to control said modulation means and said time division multiplexing means in such a way as to transmit modulated subcarrier waveforms in assigned different timeslots if these waveforms have the same subcarrier waveform frequency, said control means controlling said modulation means and said time division multiplexing means by assigning said subcarrier frequencies and said timeslots.

By assigning a same subcarrier waveform frequency to different modulation means and transmitting the signals modulated by them in different time slots using the time multiplexing means, a more efficient use of bandwidth is achieved since the substations coupled to those modulation means can use the bandwidth capacity of the same subcarrier waveform at different time instances. In this way different modulation means can use the same subcarrier waveform frequency, so that assignment of a subcarrier waveform frequency to modulation means used by a new substation is always possible. Thus substations can always be added without having to adapt the already assigned frequencies and the already installed equipment. In addition, the use of high frequency subcarrier waveform frequencies can be avoided since by assigning the same subcarrier frequency to different modulation means there is no need to assign high frequency values. In this way the total required bandwidth of the detector at the receiver arrangement side is reduced, thus in general reducing the noise. Moreover, by spreading the modulated signals over different time slots, light sources included in the convertor means of the transmitter arrangement can be adjusted to lower power or switched off when they do not send signals. As such, less light signals fall on the detector at the receiver arrangement side at the same time. This again reduces the noise.

Another object of the invention is to provide a transceiver arrangement where the above mentioned optimal bandwidth efficiency can be maintained when the bandwidth requirements of the substations change.

This object is achieved due to the fact that said modulation means are tunable to said assigned subcarrier frequencies.

Whenever the bandwidth requirements of one or more substations change, the subcarrier waveform frequency of the corresponding modulation means can thus be adapted in a way to achieve an optimal use of the bandwidth resources on the optical waveguide.

The present invention also relates to a method for transmitting information signals between a transmitter arrangement and a receiver arrangement over an optical waveguide, comprising the steps of
- modulating electrical subcarriers having assigned subcarrier frequencies with said information signals;
- converting said modulated subcarriers to optical signals which are transmitted to said receiver arrangement over said optical waveguide.

Such a method is already described in the above mentioned German patent application and has similar drawbacks as those mentioned earlier in relation with the known transceiver arrangement which realizes this method. Indeed, it does not always provide an optimal bandwidth efficiency and it is not suitable for transmission of a relatively high number of information signals at the same time.

An additional object of the invention is to provide a method of the above type, but without these mentioned drawbacks.

This is realized due to the fact that if at least two of said information signals modulate electrical subcarriers having the same subcarrier frequency, said modulated subcarriers are transmitted in different assigned timeslots.

By making it possible to transmit the modulated subcarrier waveforms in different time slots, these waveforms may have the same subcarrier waveform frequency, which leads to a more optimal use of the available bandwidth capacity on the optical waveguide. Moreover, in this way more signals can be transmitted at the same time.

The above mentioned and other objects and features of the invention will become more apparent and the invention itself will be best understood by referring to the following description of an embodiment taken in conjunction with the accompanying drawing.

BEST MODE FOR CARRYING OUT THE INVENTION

Figure 1:
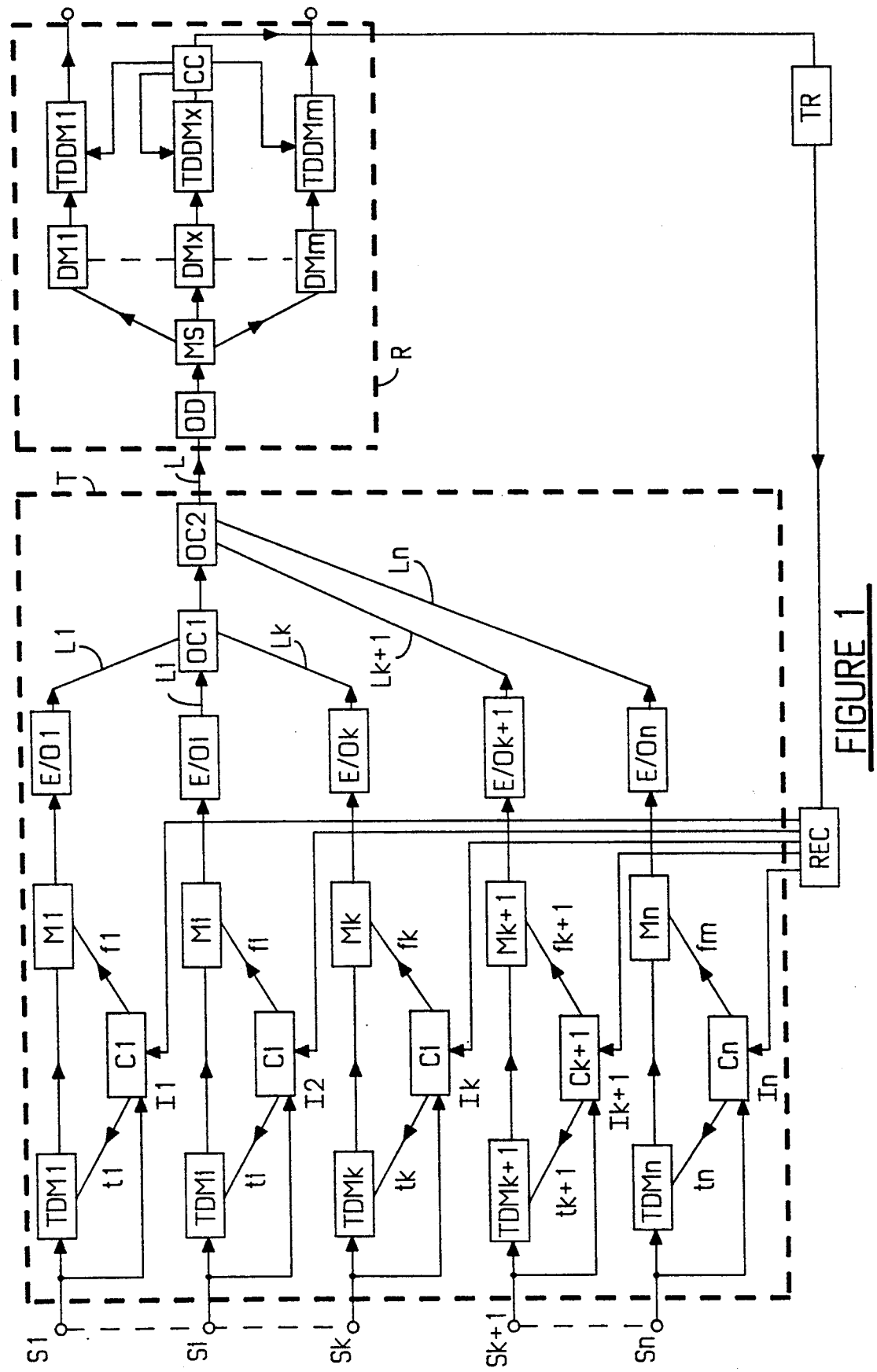
FIG. 1 is a schematic representation of an optical communication system with a transceiver arrangement according to the invention.
Figure 2:
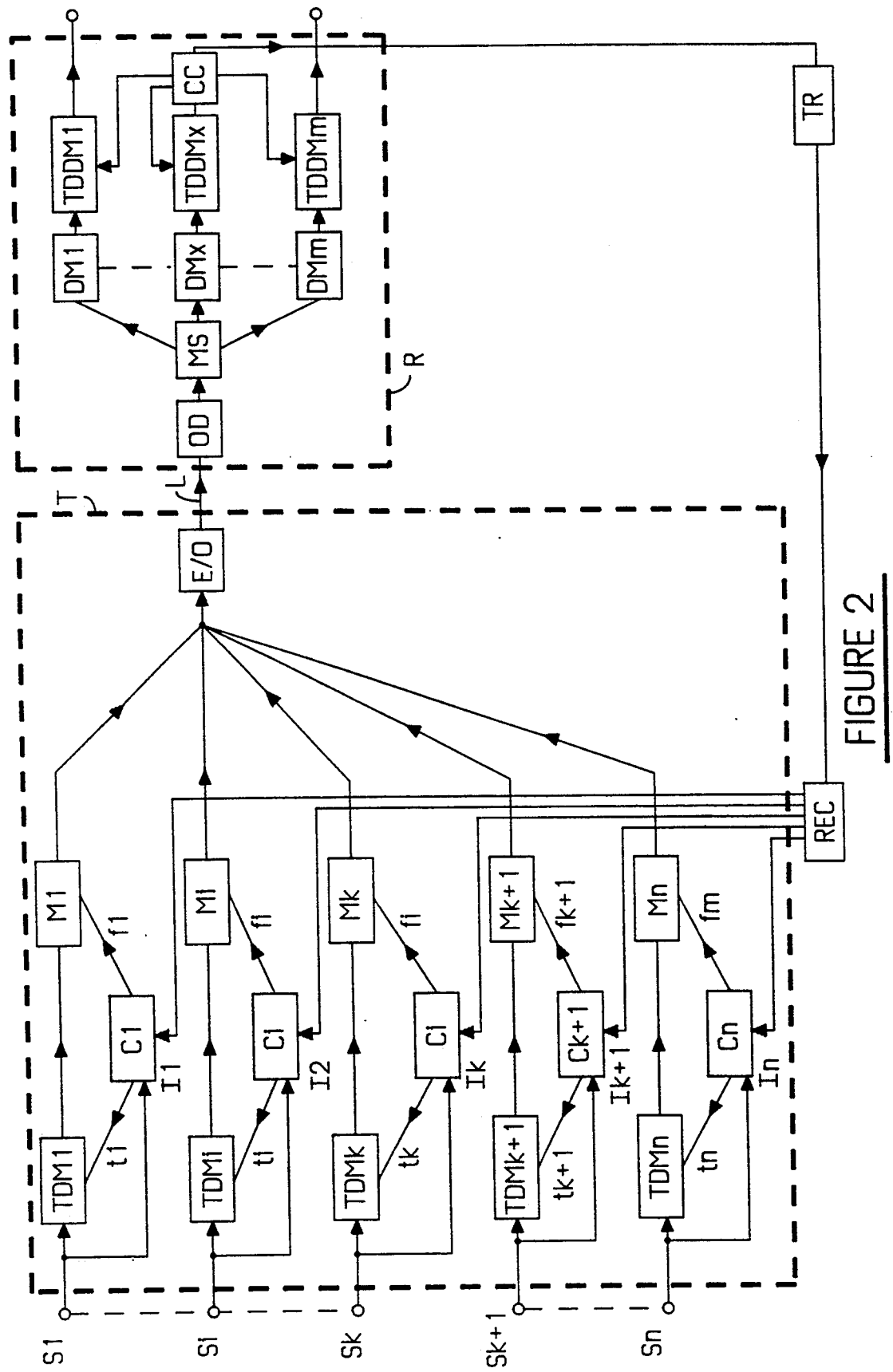
FIG. 2 is similar to FIG. 1, except electrical couplers are used to couple the plurality of modulated signals and then convert the thus-obtained composite electrical signals to a composite optical signal using a common electro/optical converter.

As shown in FIG. 2 an optical communication system comprises a transceiver arrangement including a transmitter arrangement T and a receiver arrangement R which is part of a destination center (not shown). n substations (not shown) apply information signals S1 to Sn to like named terminals of the transmitter arrangement T which is adapted to transmit these signals to the destination center over a glass fiber link L. In the destination center the received optical signals are converted to electrical information signals by the receiver arrangement R. Following is a detailed description of the transmitter and receiver arrangement T and R respectively.

The transmitter arrangement T comprises, for each substation, e.g., for the substation transmitting the information signal S1, the cascade connection of time division multiplexing means TDM1, modulation means M1 modulating an electrical subcarrier waveforms having frequency f1, with the input signal S1, and conversion means, constituted by an electro-optical converter E/01, and of a control module C1. The outputs of the electro-optical converters E/01 to E/0n are connected via respective optical waveguides L1/Ln to optical couplers OC1 for E/01 to E/0k and OC2 for E/0k+1 to E/0n. The output of the optical coupler OC1 is connected to an input of the optical coupler OC2 and the fiber link L is connected to the output of the optical coupler OC2. The control modules C1 to Cn, control the time division multiplexing means TDM1 to TDMn and the modulation means M1 to Mn respectively. They have first inputs I1 to In respectively and second inputs connected tot eh terminals S1 to Sn respectively.

The output signals of each of the time division multiplexing means TDM1/TDMn modulate the electrical subcarrier waveform produced by the associated modulation means M1/Mn. When two or more subcarrier waveforms have the same frequency, the corresponding time division multiplexing means are activated by their associated control module to apply the signal to be transmitted to the input of the associated modulation means in a predetermined time slot. For instance, when it is estimated that the modulation means M1 and Mk both modulate subcarrier waveforms with the same frequency f1, then the time division multiplexing means TDM1 and TDMk are controlled by the respective control modules C1 and Ck to send out the signals S1 and Sk in respective assigned timeslots t1 and tk.

Assignment of the different subcarrier waveform frequencies f1, . , fm and activation of the time division multiplexing means TDM1/TDMn is done by the associated control modules C1 to Cn in the following way. For instance, when an information signal Si has to be transmitted, the control module Ci is informed thereof by the substation connected to terminal Si. That control module Ci then controls the time division multiplexing means TDMi and the modulation means Mi in such a way that the subcarrier waveform modulated by a signal applied to the terminal Si has a predetermined frequency fx common to all modulation means and that the modulated signal is sent out in a time slot txi. The substation connected to the terminal Si then sends control signals to the destination center via the transmitter arrangement T, using a dedicated protocol, to inform the former about the characteristics of the signal Si. Based on the characteristic from the signals S1 to Sn, thus received from all substations, a common control module CC forming part of the receiver R computes the subcarrier frequencies f1 to fm and time slots t1 to tn to be used for transmission of the signals S1 to Sn. This information can be sent from the center to the control modules C1 to Cn using an y optical transmitter arrangement TR at the center and receiver arrangement REC at the substation side (not shown) where the receiver arrangement REC in fact represents n receiver arrangements, each with an output connected to one of the inputs I1 to In. For.instance, use could be made of a transmitting and receiving arrangement similar to those described herein.

It has to be noted that in order to compute the time slots t1 to tn, the common control module CC has to be aware of the transmission delay between the sending of an information signals at an input terminal and the receipt of that signal in the destination center. Methods for measuring this delay are well known and will not be described in detail. Basically, they comprise the sending of a control signal from the destination center to the substation and measuring of the elapsed time period upon receipt of a sent reply.

The response received form the common control module CC, i.e., frequencies f1 to fm and timeslots t1 to n, are transmitted to the respective control module C1/Cn via their respective inputs I1/In. The time division multiplexing means TDM1 to TDMn and modulation means M1 to Mn are tuned by the respective control modules C1/Cn according to the information received and the information signals S1/Sn can be further transmitted. This means for instance that the subcarrier modulated by Si is converted to an optical signal by means of the electro-optical convertor E/0i and is transmitted over the optical waveguide Li to the optical coupler OC1, via which it is transmitted over a common fiber link L as part of a composite optical signal to the mentioned center.

The technique of time division multiplexing and its realization are well known in the art, e.g., from the article "TPON—A passive Optical Network for Telephony" from J. R. Stern et al from the proceedings of ECOC '88 pages 203-206. While control modules having the functionality described above, as well as the modulation means, electro/optical convertors and optical couplers are commonly used in the art. These elements will therefore not be described in more detail.

At the destination center, the mentioned composite optical signal is applied to the input of a receiver arrangement R, where it is converted to a composite electrical signal by an optical detector OD. This composite electrical signal is then split over m communication lines by an electrical splitter MS and each split signal is demodulated by one of the demodulating means DM1 to DMm using subcarrier waveforms with fixed respective frequencies f1 to fm. The demodulated signals are then demultiplexed, if necessary, i.e., if they contain signals in different time slots, by well known time division demultiplexing circuits TDDM1 to TDDMm. For instance, since the information signals S1 and Sk at the substation side modulated subcarriers waveforms with the same frequency f1, these modulated signals were transmitted in time slots t1 and tk respectively. The corresponding signal demodulated at the center side with a subcarrier waveform with frequency f1 thus contains two information signals S1 and Sk in a different time slot t1 and tk and has to be time demultiplexed.

On of the demodulating means DMx with its corresponding demultiplexing means TDDMx is dedicated to the control signals sent by the substations as described earlier. The demultiplexing means TDDMx distinguish the demodulated control signals with subcarrier waveform frequency fx sent by the different substations by their proper fixed timeslots tx1 to txn. The thus obtained control signals are analyzed by the common control module CC coupled to the output of the time division demultiplexing means TDDMx. This common control module includes a processor to keep track of the information received from the substations and to compute based thereon the subcarrier frequencies f1 to fm and time slots t1 to tn to be used for transmission of the information signals S1 to Sn form the substations to the destination center, in order to efficiently use the available bandwidth resources on the optical waveguide L. These frequencies f1 to fm and time slots t1 to tn are transmitted to the transmitting arrangement T as described earlier. Information concerning the identity of the substations transmitting information signals in a determined time slot is communicated to the corresponding time division demultiplexer means TDDM1 to TDDMm by the common control module CC, so that they are able to identify the owners of the different time slots.

Another way of realizing the transmitter arrangement T described earlier, as shown in FIG. 2, is to use electrical couplers to coupler a plurality of modulated signals and to convert the thus obtained composite electrical signal to a composite optical signals using a common electro/optical converter. This can be applied in case of a distribution wherein the substations have their own coaxial-cable and share an optical fiber cable for transmission to the receiving center.

Figure 3:
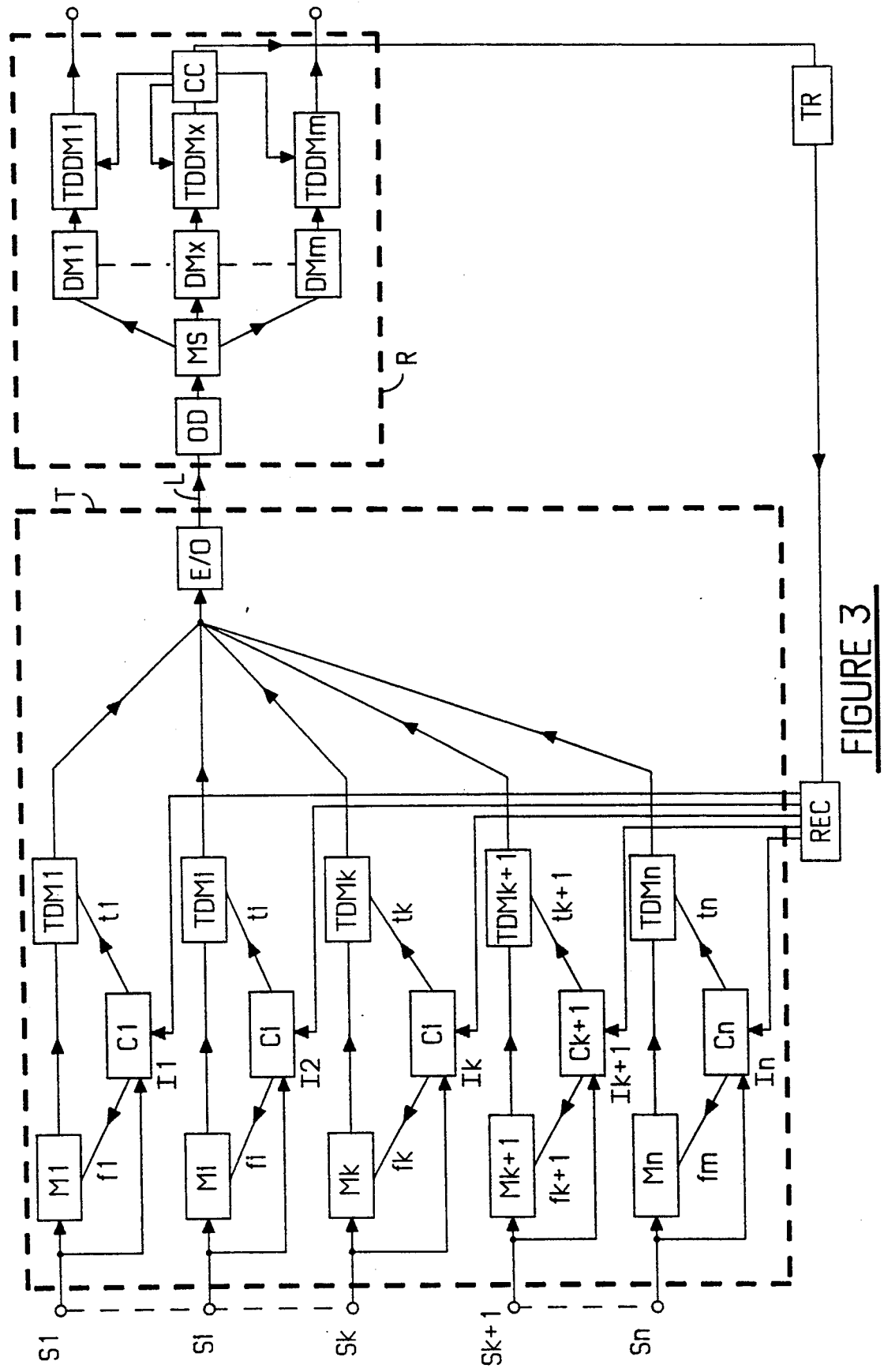
FIG. 3 is the same as FIG. 2, except the ordering of the time-division multiplexing and modulation means has been reversed.
Figure 4:
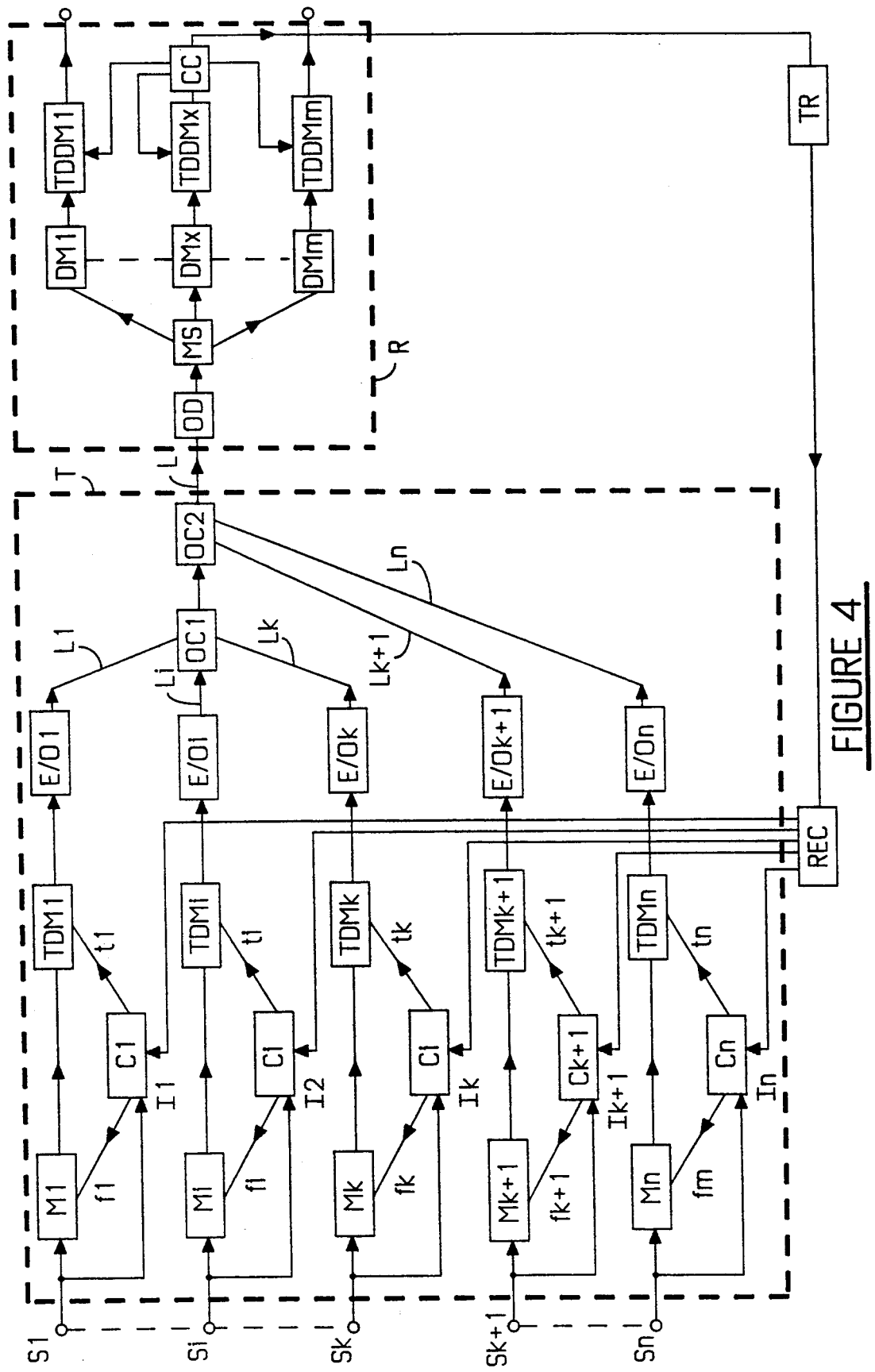
FIG. 4 is similar to FIG. 1, except that the time-division multiplexing and modulation means have been interchanged.

It has to be noted that in the transmitter arrangement described above, the time division multiplexing and modulation means could be interchanged from the foregoing, as shown in FIGS. 3 and 4.

Whenever the bandwidth requirements of a substation change or a new substation is added this is communicated to the common control module CC, which reevaluates the corresponding frequency and time slot or assigns a new frequency and time slot in case of addition of a new substation and accordingly informs the corresponding control module of the new subcarrier waveform frequency and time slot. The frequencies and time slots assigned to the other substations remain unchanged.

The available bandwidth resources could be used in an even more optimal way by reevaluating all the subcarrier waveform frequencies f1/fm and all time slots t1/tn each time the requirements of a substation changes or a substation is added or deleted. This of course implies a more complex common control module and a more complicated control of the time multiplexing and modulation means.

It has to be noted that by modulating the subcarrier waveforms with different types of information signals in such a way that all signals of the same type modulate subcarrier waveforms with the same frequency, these signals are automatically grouped together per type at the destination center since all signals of one type are demodulated there by the same demodulator means.

The time division demultiplexing means could be disabled at the destination center if further processing of the demodulated signals does not need the separation of the multiplexed signals.

It has also to be noted that since the subcarrier waveform frequencies f1 to fm of the receiving arrangement are fixed, the modulator means of the transmitting arrangement has to be tunable only over corresponding discrete sets of frequencies.

While the principles of the invention have been described above in connection with specific apparatus, it is to be clearly understood that this description is made only by way of example and not as a limitation on the scope of the invention.

We claim:

1. Transceiver arrangement for an optical communication system to transmit n electrical information signals applied to respective input terminals by n substations, to a receiver arrangement over an optical waveguide, said transceiver arrangement including a transmitter arrangement, comprising:

n modulation means each of which has an input coupled to a respective one of said input terminals and is above to modulate a respective one of n electrical subcarrier waveforms having an assigned frequency with the information signal applied to said input, and conversion and combining means having inputs connected to the outputs of said modulation means and an output at which a composite optical signal derived form said modulated subcarrier waveforms is generated, said composite optical signal being transmitted to said receiver arrangement over said optical waveguide, wherein said transmitter further comprises time division multiplexing means and said transceiver additionally comprises control means to control said modulation means and said time division multiplexing means in such a way as to transmit modulated subcarrier waveforms in assigned different timeslots if these waveforms have the same subcarrier waveform frequency, and control means controlling said modulation means and said time division multiplexing means by assigning said subcarrier frequencies and said timeslots.

2. Transceiver arrangement according to claim 1, wherein said conversion and combining means comprise:
n conversion means, each having an output and an input connected to the output of a respective one of said associated time division multiplexing and modulation means, to convert the modulated subcarrier waveform applied at said input to an optical signal generated at said output; and
combining means having n inputs each connected to the output of one of said conversion means, to combine said optical signals to a composite optical signal which is transmitted to said receiver arrangement over said optical waveguide.

3. Transceiver arrangement according to claim 1 characterized in that said conversion and combining means comprise
combining means having an output and n inputs each connected to the output of one of said associated time division multiplexing and modulation means to combine said modulated subcarrier waveforms to a composite electrical signal provided at said output; and
conversion means having an input connected to the output of said combining means to convert said composite electrical signal to a composite optical signal which is transmitted to said receiver arrangement over said optical waveguide.

4. Transceiver arrangement according to claim 2, wherein said time division multiplexing means each have an input connected to a respective one of said input terminals and an output connected to an input of a respective one of said modulation means thus representing said associated time division multiplexing and modulation means, the outputs of which are constituted by the outputs of said modulation means.

5. Transceiver arrangement according to claim 2, wherein said modulation means each have an input connected to a respective one of said input terminals and an output connected to an input of a respective one of said time division multiplexing means thus representing said associated time division multiplexing and modulation means, the outputs of which are constituted by the outputs of said time division multiplexing means.

6. Transceiver arrangement according to claim 1, wherein said control means comprise a common control module and n individual control modules which are a part of said transmitter arrangement, each of said individual control modules controlling a respective one of said time division multiplexing means and of said modulation means and communicating with said common control module the corresponding values of said subcarrier frequencies and said timeslots.

7. Transceiver arrangement according to claim 6, wherein said individual control modules each have an input connected to a respective one of said input terminals, to receive from the respective station a control signal to tune the respective modulation means and time division multiplexing means to a predetermined common subcarrier frequency and predetermined time slot respectively to allow communication of said substations with said common control module, using said predetermined common subcarrier frequency and said predetermined time slot, to inform said common control module about the characteristics of an information signal applied to said input terminal.

8. Transceiver arrangement according to claim 7, wherein said common control module is part of said receiver arrangement.

9. Transceiver arrangement according to claim 8, wherein said common control module includes first means to determine the transmission delays to transmit said information signals from the input terminals to said common control module and second means to determine, based on said transmission delays and said characteristics of said information signals said subcarrier frequencies and said timeslots.

10. Transceiver arrangement according to claim 1, wherein said modulation means are tunable to said assigned subcarrier frequencies.

11. Transceiver arrangement according to claim 1, wherein said receiver arrangement includes:
second conversion means to convert said composite optical signal to a composite electrical signal;
splitting means having m outputs and an input connected to an output of said second conversion means to split the composite electrical signal applied to said input in m composite electrical signals which are provided at said outputs;
m demodulation means each having an output and an input connected to one of the outputs of said splitting means to demodulate the split composite electrical signal applied at said input, thereby generating at said output an intermediate signal;
m time division demultiplexing means each with an input connected to the output of a corresponding one of said demodulation means to time demultiplex the corresponding intermediate signal if said intermediate signal consists of a plurality of signals in different time slots.

12. Transceiver arrangement according to claim 8, wherein said common control module has an input coupled to an output of a predetermined one of said time division demultiplexing means adapted to process signals transmitted in said predetermined time slots said predetermined time division demultiplexing means being coupled to corresponding demodulation means adapted to process signals having said predetermined common subcarrier frequency.

13. Method for transmission of information signals between a transmitter arrangement and a receiver arrangement over an optical waveguide, comprising the steps of:
modulating electrical subcarriers having assigned subcarrier frequencies with said information signals;
converting said modulated subcarriers to optical signals which are transmitted to said receiver arrangement over said optical waveguide, wherein if at least two of said information signals modulate electrical subcarriers having the same subcarrier frequency, said modulated subcarriers are transmitted in different assigned timeslots.

14. The transceiver of claim 3, wherein said time division multiplexing means each have an input connected to a respective one of said input terminals and an output connected to an input of a respective one of said modulation means thus representing said associated time division multiplexing and modulation means, the outputs of which are constituted by the outputs of said modulation means.

15. The transceiver of claim 3, wherein said modulation means each have an input connected to a respective one of said input terminals and an output connected to an input of a respective one of said time division multiplexing means thus representing said associated time division multiplexing and modulation means, the outputs of which are constituted by the outputs of said time division multiplexing means.

16. The transceiver of claim 11, wherein said common control module has an input coupled to an output of a predetermined one of said time division demultiplexing means adapted to process signals transmitted in said predetermined time slots said predetermined time division demultiplexing means being coupled to corresponding demodulation means adapted to process signals having said predetermined common subcarrier frequency.

17. Transceiver arrangement for an optical communication system and adapted to transmit n electrical information signals applied to respective input terminals by n substations, to a receiver arrangement over an optical waveguide, said transceiver arrangement including a transmitter arrangement which includes:
n modulation and time division multiplexing means each of which has an input coupled to a respective one of said input terminal and an output on which is generated a modulated waveform having an assigned timeslot for transmission; and
conversion and combining means connected to said modulation and time division multiplexing means and having an output on which a composite optical signal derived from said modulated waveforms is generated, said composite, optical signal being transmitted to said receiver arrangement over said optical waveguide, as wherein each of said n modulation and time division multiplexing means includes:
a modulation means which has an input coupled to said respective input terminal and is able to modulate a respective one of n electrical subcarrier waveforms having an assigned frequency with a respective information signal applied to said input, said modulated waveform being thus a modulated subcarrier waveform; and
a time division multiplexing means;
and wherein said transceiver additionally includes control means to control said modulation means and said time division multiplexing means to flexibly assign said frequencies and said timeslots.

18. Transceiver arrangement according to claim 17, wherein said control means is adapted to control said modulation means and said time division multiplexing means to transmit said modulated subcarrier waveforms in said assigned timeslots if these waveforms have the same subcarrier frequency.

19. Transceiver arrangement according to claim 17, wherein said conversion and combining means comprises:
n conversion means each having an output and an input connected to the output of a respective one of said modulation and time division multiplexing means, to convert the modulated subcarrier waveform applied at said input to an optical signal generated on said output; and
combining means having n inputs each connected to the output of one of said conversion means, to combine said optical signals thereby obtaining said composite optical signal.

20. Transceiver arrangement according to claim 17, wherein said conversion and combining means comprises:
combining means having an output and n inputs each connected to the output of a respective one of said modulation and time division multiplexing means to combine said modulated subcarrier waveforms to a composite electrical signal provided on said output; and
conversion means having an input connected to the output of said combining means to convert said composite electrical signal to said composite optical signal.

21. Transceiver arrangement according to claim 19, characterized in that said time division multiplexing means has an input connected to a respective one of said input terminals and an output connected to an input of a respective one of said modulation means, the output of which represents the output of the related modulation and time division multiplexing means.

22. Transceiver arrangement according to claim 20, wherein said time division multiplexing means has an input connected to a respective one of said input terminals and an output connected to an input of a respective one of said modulation means, the output of which represents the output of the related modulation and time division multiplexing means.

23. Transceiver arrangement according to claim 19, wherein said modulation means have an input connected to a respective one of said input terminals and an output connected to an input of a respective one of said time division and multiplexing means the output of which represents the output of the related modulation and time division multiplexing means.

24. Transceiver arrangement according to claim 20, wherein said modulation means have an input connected to a respective one of said input terminals and an output connected to an input of a respective one of said time division and multiplexing means the output of which represents the output of the related modulation and time division multiplexing means.

25. Transceiver arrangement according to claim 17, wherein said control means consist of a common control module and of n individual control modules which are part of said transmitter arrangement, each of said individual control modules controlling a respective one of said time division multiplexing means and of said modulation means and communicating with said common control module to receive from said common control module the corresponding values of said subcarrier frequencies and said timeslots in order to perform said control.

26. Transceiver arrangement according to claim 25, wherein said individual control modules each have an input connected to a respective one of said input terminals, to receive from the respective station a control signal to tune the respective modulation means and time division multiplexing means to a predetermined common subcarrier frequency and a predetermined timeslot respectively to allow communication of said substation with said common control module, using said predetermined common subcarrier frequency and said predetermined timeslot, to inform said common control module about the characteristics of an information signal applied to said input terminal.

27. Transceiver arrangement according to claim 26, wherein said common control module is part of said receiver arrangement.

28. Transceiver arrangement according to claim 27, wherein said common control module includes first means to determine the transmission delays to transmit said information signals from the input terminals to said common control module and said means to determine said subscriber frequencies and said timeslots based on said transmission delays and said characteristics of said information signals.

29. Transceiver arrangement according to claim 17, wherein said modulation means are tunable to said assigned subcarrier frequencies.

30. Transceiver arrangement according to claim 17, wherein said receiver arrangement includes:
   second conversion means to convert said composite optical signal to a composite electrical signals;
   splitting means having m outputs and an input connected to an output of said second conversion means to split the composite electrical signal applied to said input in m composite electrical signals which are provided at said outputs;
   m demodulation means each having an output and an input connected to one of the outputs of said splitting means to demodulate the split composite electrical signal applied at said input, thereby generating at said output an intermediate signal;
   m time division demultiplexing means each with an input connected to the output of a corresponding one of said demodulation means to time demultiplex the corresponding intermediate signal if said intermediate signal consists of a plurality of signals in different timeslots.

31. Transceiver arrangement according to claim 30, wherein said common control module has an input coupled to an output of a predetermined one of said item division demultiplexing means adapted to process signals transmitted in said predetermined timeslots, said predetermined time division demultiplexing means being coupled to a corresponding demodulation means adapted to process signals having said predetermined common subcarrier frequency.

32. Method for simultaneously transmitting information signals between a transmitter arrangement and a receiver arrangement over an optical waveguide, said method comprising the steps of:
   modulating electrical subcarriers having assigned subcarrier frequencies with said information signals;
   converting said modulated subcarriers to optical signals; and
   transmitting at least two of said optical signals in different assigned timeslots when said optical signals have the same subcarrier frequency.

33. Transceiver arrangement according to claim 26, wherein said common control module has an input coupled to an output of a predetermined one of said time division demultiplexing means adapted to process signals transmitted in said predetermined timeslots, said predetermined time division demultiplexing means being coupled to a corresponding demodulation means adapted to process signals having said predetermined common subcarrier frequency.

* * * * *

UNITED STATES PATENT AND TRADEMARK OFFICE
CERTIFICATE OF CORRECTION

PATENT NO. : 5,323,255
DATED : June 21, 1994
INVENTOR(S) : Sierens et al

It is certified that error appears in the above-indentified patent and that said Letters Patent is hereby corrected as shown below:

Column 6, line 51, claim 1, "above" should be --able--;
Column 6, line 62, claim 1, after "transmitter" the word --arrangement-- should be inserted;
Column 7, line 1, claim 1, "and" should be --said--;
Column 9, line 35, claim 17, the word "as" should be cancelled;
Column 11, line 5, claim 28, the word "said" should be --second--;
Column 12, line 4, claim 31, the word "item" should be --time--.

Signed and Sealed this

Thirteenth Day of September, 1994

Attest:

BRUCE LEHMAN

*Attesting Officer*  *Commissioner of Patents and Trademarks*